Oct. 13, 1925.
B. DADD
1,556,763
CUTLERY
Filed June 27, 1921
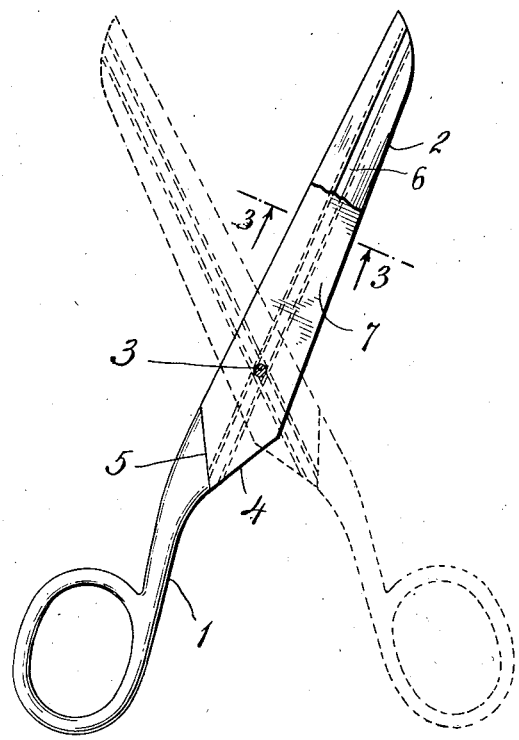
Fig. 1,
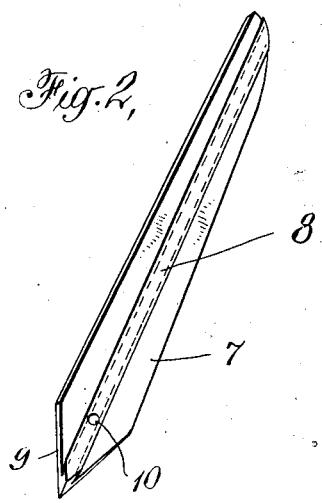
Fig. 2,
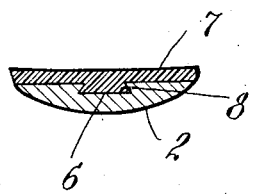
Fig. 3.
Inventor
BENJAMIN DADD
By his Attorneys Patented Oct. 13, 1925.

1,556,763

UNITED STATES PATENT OFFICE.

BENJAMIN DADD, OF NEW YORK, N. Y.

CUTLERY.

Application filed June 27, 1921. Serial No. 480,512.

*To all whom it may concern:*

Be it known that I, BENJAMIN DADD, a citizen of the United States, residing at New York, in the county of New York, State of New York, have invented certain new and useful Improvements in Cutlery; and I do hereby declare the following to be a full, clear, and exact description of the invention, such as will enable others skilled in the art to which it appertains to make and use the same.

My invention is an improvement in cutlery, of the character having blades provided with cutting edges, and relates especially to a new and improved construction of cutting edge. In the manufacture of tools having blades provided with cutting edges, as for instance, scissors, it is usual to make only the cutting edge and adjacent parts of material capable of taking and holding an edge. Such material is brittle, and lacks the toughness and strength needed for the tool, and the remaining parts are of stronger and tougher material. This end is attained, by tempering only the cutting edge of the blade, or by welding a tempered cutting edge to the blade. Either procedure increases the difficulty of manufacture, and adds materially to the cost of the tool. Furthermore, when from continued use or improper grinding, the blade is no longer serviceable, the entire tool must be discarded.

The object of the present invention is to provide in tools of this character, a separable cutting edge, independent of the blade, but easily attached thereto, so that the edge may be tempered to the required hardness, independently of the blade, and when no longer serviceable may be easily detached and replaced by a new edge.

A further object is to provide a form of separable cutting edge, especially adapted for scissors construction, wherein the cutting edges of the two blades are secured in place by the means which pivotally connects the blades.

In the drawings, Fig. 1, is a plan view of a pair of scissors, with parts broken away, Fig. 2 is a perspective view of one of the separable cutting edges, Fig. 3 is a section on the line 3—3 of Fig. 1.

The present embodiment of the invention is shown in connection with a pair of scissors, the scissors consisting of the usual blades, each of which has a handle portion 1, and blade portion 2, the said portions being integral, and in the present instance throughout of a material tough and strong enough for the purpose, and the blades are pivotally connected by the usual screw 3, in crossed relation. Each of the blades is recessed or rabbeted on its inner face, that is, on the face adjacent to the other blade, throughout the blade portion, and beyond the pivotal connection as shown at 4, and a shoulder 5 is provided at the inner end of each of the rabbeted portions. Each blade portion has a groove 6, extending longitudinally of the rabbeted face, and each of the said grooves 6 is undercut, as clearly shown in Fig. 3.

The cutting edges are in the form of plates 7 of suitable material, as for instance, tool steel, and each of the said plates is of an area commensurate with the rabbeted portion of a blade, and shaped to fit thereon, and to fill the recess formed by the rabbeting. The inner end of the plate 7 is beveled to fit smoothly against the shoulder 5, and each plate has on one face a longitudinally extending rib 8, shaped to fit the groove 6 of the blade. The ribs 8 have undercut side walls as shown in Fig. 3, and the plates are placed on the blades, from the end remote from the handle portion. The rib 8 is inserted in the groove 6, and the plate is pushed toward the handle portion of the blade until the beveled end 9 thereof strikes the shoulder 5. Each of the plates has a transverse opening near the beveled end 9 and these openings 10 are adapted to register with the openings of the blades, which receive the pivot screw 3 before mentioned. It will be understood that the plates are of such dimensions that they will exactly fill the recesses formed by the rabbeting of the blades, and the edges of the plates 7, which are adjacent when the plates are in place on the blades, are beveled as shown in Fig. 3, in the same manner as the usual construction of scissors blades are beveled, to cooperate in a shearing action when the blades are moved toward each other, swinging on the pivot screw. Preferably the adjacent faces of the two plates are slightly hollow ground, in order that the cutting edges may cut smoothly and evenly, without undue friction. Scissors so ground cut with less friction, and retain their cutting edge in better condition. The exposed faces of the plates are wholly continuous and without interruptions of any kind to afford lodgment for dust or bacteria.

It will be evident that since the plates, or cutting edges, are independent of the blades, they may be tempered to the required hardness, before being placed on the blades. The blades themselves may be of a material cheaper than that of the plates 7 and more suitable for the purpose, because of strength and toughness. The blades, including the handles, may be of any material which is suitable for the purpose, and may be suitably ornamented if desired. It will be obvious that when a cutting edge is no longer serviceable through continued use or improper grinding, the plate may be discarded, and be replaced by a new plate. With the usual construction of scissors, when the blades are no longer serviceable, the entire tool must be discarded. With the improved cutting edge the tool is practically indestructible in ordiary use.

It will be evident that the improved scissors are complete scissors without the plates, each member consisting of a blade portion and a handle portion. The plates which are coextensive with the blades, are fitted on the inner faces thereof, in such manner that the cutting edges extend slightly beyond the cutting edges of the blades.

I claim:

In scissors construction, a pair of blades pivoted together, each blade being provided with a handle portion, each blade being formed with a longitudinal dovetail groove which extends from the tip of the blade to a position adjacent the handle portion, each blade being provided with a plate co-extensive with and covering the blade on one side thereof, the said plates having cutting edges acting as the cutting edges of the scissors and the said cutting edges of the plates being arranged closely contiguous to the edges of the said blades, the said plates having each an under-cut rib extending from end to end of the plate and slidably engaging with the said dovetail grooves in the blades whereby the exposed faces of the plates are wholly continuous throughout and uninterrupted by depressions or recesses, and a pivotal screw passing through both the blades and the plates to hold all the parts in operative positions.

In testimony whereof I affix my signature.

BENJAMIN DADD.